(12) United States Patent
Starr et al.

(10) Patent No.: US 12,497,160 B2
(45) Date of Patent: Dec. 16, 2025

(54) AIRCRAFT INCEPTOR APPARATUS AND AIRCRAFT FLIGHT CONTROL SYSTEM

(71) Applicant: Lilium eAircraft GmbH, Wessling (DE)

(72) Inventors: Rodrigo Rizzi Starr, Munich (DE); Robert Austen Fox, Reading (GB); Markus Scherdel, Amstetten (DE); Alex Duarte Gomes, Germering (DE); Vicente Martínez Martínez, Gilching (DE); Fabio Wilson Rodrigues, Huntington Beach, CA (US); Rogério De Cerqueira Lario, Munich (DE)

(73) Assignee: Lilium eAircraft GmbH, Wessling (DE)

( * ) Notice: Subject to any disclaimer, the term of this patent is extended or adjusted under 35 U.S.C. 154(b) by 0 days.

(21) Appl. No.: 18/609,385

(22) Filed: Mar. 19, 2024

(65) Prior Publication Data
US 2024/0262490 A1    Aug. 8, 2024

Related U.S. Application Data

(63) Continuation of application No. 17/673,961, filed on Feb. 17, 2022, now Pat. No. 12,006,023.

(30) Foreign Application Priority Data

Feb. 19, 2021  (EP) .................................... 21158250
Feb. 4, 2022   (WO) ................. PCT/EP2022/052744

(51) Int. Cl.
*B64C 13/10*    (2006.01)
*B64C 13/04*    (2006.01)
(Continued)

(52) U.S. Cl.
CPC .......... *B64C 13/0421* (2018.01); *B64C 13/10* (2013.01); *B64C 13/12* (2013.01);
(Continued)

(58) Field of Classification Search
CPC ..... B64C 13/0421; B64C 13/10; B64C 13/12; B64C 13/503; G05D 1/0077
(Continued)

(56) References Cited

U.S. PATENT DOCUMENTS 3,454,920 A    7/1969  Mehr
4,584,510 A    4/1986  Hollow
(Continued)

FOREIGN PATENT DOCUMENTS

WO    2019/084504 A1    5/2019

OTHER PUBLICATIONS

European Search Report for EP 21 158 250.7. Mailed Aug. 9, 2021. 8 pages.
(Continued)

*Primary Examiner* — Troy Chambers
(74) *Attorney, Agent, or Firm* — Meunier Carlin & Curfman LLC

(57) ABSTRACT

An inceptor apparatus for an aircraft having a primary inceptor member provided in the form of a stick member having a grip portion, at which the stick member can be gripped by a pilot's hand, and a secondary inceptor member provided at an upper portion of the primary inceptor member and having an actuating portion, at which the secondary inceptor member can be manually actuated by a pilot's thumb. Both inceptor members have associated a respective sensor assembly which is provided to generate electronic flight control signals or commands in response to at least one of i) pivoting movements of the respective inceptor member around each of two independent maneuvering axes associ-
(Continued)

ated to the inceptor member, ii) forces acting on or via the respective inceptor member in pivoting directions with respect to each of the maneuvering axes, and iii) lateral flexing or bending of the respective inceptor member.

16 Claims, 5 Drawing Sheets

(51) Int. Cl.
*B64C 13/12* (2006.01)
*B64C 13/14* (2006.01)
*B64C 13/50* (2006.01)
*G05D 1/00* (2006.01)
*G05D 1/87* (2024.01)

(52) U.S. Cl.
CPC ............ *B64C 13/14* (2013.01); *B64C 13/503* (2013.01); *G05D 1/0077* (2013.01); *G05D 1/87* (2024.01)

(58) Field of Classification Search
USPC .......................................................... 244/234
See application file for complete search history.

(56) References Cited

U.S. PATENT DOCUMENTS

| | | |
|---|---|---|
| 4,688,443 A | 8/1987 | Fabre et al. |
| 2012/0072056 A1 | 3/2012 | Hasan et al. |
| 2016/0114882 A1 | 4/2016 | Lin et al. |
| 2019/0025869 A1 | 1/2019 | Parazynski |
| 2019/0161170 A1 | 5/2019 | Taylor |
| 2019/0241252 A1* | 8/2019 | Shue ....................... B64C 13/04 |
| 2020/0023941 A1 | 1/2020 | Gillett et al. |
| 2020/0198766 A1 | 6/2020 | Dee |

OTHER PUBLICATIONS

International Search Report and Written Opinion issued for Application No. PCT/EP2022/052744, dated Apr. 20, 2022.

"Flight Simulator and Licensed Cessna Pro Flight Sim Products and the Latest X-56." Saitek.com, Dec. 22, 2004, www.saitek.com/manuals/x52_manual.pdf (Year: 2004).

* cited by examiner

AIRCRAFT INCEPTOR APPARATUS AND AIRCRAFT FLIGHT CONTROL SYSTEM

CROSS REFERENCE TO RELATED APPLICATIONS

This application is a continuation application of U.S. application Ser. No. 17/673,961 filed Feb. 17, 2022, which is fully incorporated by reference, and which claims priority to European Patent Office (EPO) PCT/EP2022/052744 filed Feb. 4, 2022 and EP 21158250.7 filed Feb. 19, 2021.

TECHNICAL FIELD

The present invention generally relates to an inceptor apparatus for an aircraft suitable for being used as part of a fly-by-wire user interface of the aircraft, and a corresponding flight control system for an aircraft. More specifically, the invention relates to a flight control system having a redundant user interface comprising at least one such inceptor apparatus.

BACKGROUND

Aircrafts maybe generally classified into fixed wing and rotating wing types. Fixed wing aircrafts typically include a plurality of flight control surfaces that, when controllably positioned, guide the movement of the aircraft from one destination to another destination. The number and type of flight control surfaces included in an aircraft may vary. Primary flight control surfaces are typically those that are used for controlling the aircraft movement with respect to the pitch, yaw and roll axes. Secondary flight control surfaces are typically those that are used to influence the lift or drag (or both) of the aircraft. Typical primary flight control surfaces include elevators, ailerons and rudder, and typical secondary flight control surfaces include a plurality of flaps, slats, speed brakes and spoilers.

Rotary-wing aircraft, such as e.g. helicopters, typically do not have flight control surfaces that are separated from the airfoils that produce lift, but the airfoils that constitute the rotating wing have a cyclic control for pitch and roll, and a collective control for lift.

Further, aircrafts are known, which have a vertical take-off and landing capability based on propulsion engines, which are mounted rotatably with respect to a transvers axis or pitch axis of the aircraft. The propulsion engines are controllably movable between a cruising flight position and a take-off/landing position. In the cruising position the engines provide forward thrust and the movement of the aircraft through the air is controlled by means of suitable flight control surfaces. In the take-off/landing position, the propulsion engines are angled downwards for allowing a vertical take-off or landing based on the thrust provided by the engines.

Such types of aircraft with vertical take-off and landing capability and having electrically driven ducted propellers as propulsion engines have been proposed by the present applicant Lilium GmbH according to the publications US 2016/0023754 A1 and US 2016/0311522 A1 and further publications of the same patent families. The present applicant meanwhile has developed an aircraft denoted as Lilium jet, which is a canard type aircraft and has plural left front engines, plural right front engines, plural left aft engines and plural right aft engines in the form of ducted propellers operated electrically, which are mounted to respective flaps of the front left and right canard wing and the left and right aft or main wing of the canard type aircraft. The first test flight of this Lilium jet was performed on Oct. 1, 2019.

For any such kind of aircrafts and any other type of aircraft, the user interface of the respective flight control system is particularly relevant for safeguarding safe flights. Convenience for the pilot and resilience against technical failures are important aspects. Traditionally, the interface between the pilot and the mentioned flight control surfaces is provided by at least one control stick and pedals. Alternatively, a left and a right side stick are provided.

A typical inceptor apparatus for an aircraft e.g. in the form of a so-called sidestick apparatus comprises an apparatus base, an inceptor member provided in the form of a stick member having a grip portion and an associated sensor assembly. The stick member is movably mounted at a stick member base relative to the apparatus base, by means of a multiple degree of freedom assembly, such that the stick member can pivotably move around two independent maneuvering axes associated to the stick member. The sensor assembly is provided to generate electric flight control signals or commands in response to at least one of pivoting movements of the stick member around each of the maneuvering axes and forces acting on or via the stick member in pivoting directions with respect to each of the maneuvering axes.

For example, such an inceptor apparatus is known from US 2008/0011905 A1, US 2017/0212514 A1, WO 2015/001320 A1 and U.S. Pat. No. 2,934,292. Further, it is referred to U.S. Pat. Nos. 8,078,340 B2 and 3,771,037.

Some of such known inceptor apparatus provide a kind of redundancy concerning the control commands given by a pilot by means of the stick member or sidestick based on forces applied to force sensors integrated or associated to the stick member or sidestick and the positional actuation of the stick member or sidestick by the pilot.

According to U.S. Pat. No. 2,934,292, a control stick is connected mechanically or hydraulically to aileron actuators and elevator actuators. Further, a force sensor assembly is integrated into the control stick and electrical pick off signals from the force sensor assembly are fed via amplifiers to aileron and elevator servos, which are connected with the aileron and elevator actuators. Therewith the ailerons and the elevators can be controlled on basis of the positioning of the control stick by the pilot as well as by the forces applied by the pilot to the control stick.

According to U.S. Pat. No. 8,078,340 B2, a pilot user interface and a co-pilot user interface each are provided with a flight control stick. Associated to the respective flight control stick are force sensors as well as position sensors, which supply user interface position signals and user interface force signals to a control arrangement of the aircraft. The control arrangement supplies flight control surface position commands to flight controls, which in turn supply power to the appropriate flight control surface actuators. Associated to the respective control stick are motors, for supplying a user interface feedback force to the respective control stick based on a motor control effected by the control arrangement.

U.S. Pat. No. 3,454,920 discloses a joystick control member of an aircraft, helicopter, space vehicle or the like, which has a hand grip and an integrated secondary control element of the so-called "stiff-stick" type. This control element is provided in the form of an elongated flexible shaft or stick member, which is attached at its lower end at the bottom of a recess in the upper portion of the hand grip. A pilot's hand gripping the joystick at the hand grip may readily press an operating knob fixed to the upper end of the elongated flexible shaft or stick member in any lateral direction. A plurality of strain gauges are mounted to the circumferential surface of the shaft or stick member, which are connected with electric circuit means to provide electrical signals in response to lateral bending and flexing of the elongated flexible shaft or stick member. According to a discussion of technical background in the introductory portion of the US patent document, it appears that this secondary control element is intended to be used as fire control element or as control element in a radar or other tracking system.

Commercial aircrafts for passenger air transportation fly with two pilots and therewith have redundant pilot controls. Commercial fly-by-wire aircrafts use typically one of two options to provide redundant pilot controls: Aircrafts with traditional control columns have the columns of both pilots mechanically connected. In the case of a jam or failure of one control column, a manual disconnection mechanism allows the crew to separate the columns, so that the unjammed-one can be used to finish the flight. In aircrafts with sidesticks, each sidestick has a "priority" button or similar that allows the pilot pressing it to have full control of the aircraft and, if pressed long enough, the other sidestick will be declared failed.

Single-pilot military aircraft do not have to comply with the same stringent safety requirements as the ones used for civilian aircraft, so that such a redundancy as provided by two alternative user interfaces, which may be used independently of each other, is not required.

However, civilian single-pilot intended for passenger transportation must comply with regulatory requirements such as EASA SC-VTOL 2510 requirements calling for redundancy. Fulfilling such requirements based on conventional concepts may pose particular problems concerning weight and complexity and needed installation space.

In view of the forgoing, it is an object of the present invention, to provide an inceptor apparatus for an aircraft, on the basis of which a substantial redundancy against technical failures can be achieved, without requiring completely redundant inceptor systems.

It is a further object of the present invention, to provide an inceptor apparatus for an aircraft, which can be conveniently be used by a pilot for piloting the aircraft.

SUMMARY OF THE INVENTION

For achieving at least one of these objects, the invention, according to a first aspect, provides a flight control system for an aircraft, comprising at least one inceptor apparatus, which is electronically or optically connected with a flight control computer system, the flight control computer system being configured to effect a flight control of the aircraft based on flight control signals or commands received from the inceptor apparatus. The inceptor apparatus comprises:
  an apparatus base;
  a primary inceptor member provided in the form of a stick member having a grip portion, at which the stick member can be gripped by a pilot's hand, wherein the primary inceptor member is mounted at a primary inceptor member base relative to the apparatus base;
  a primary sensor assembly which is provided to generate electronic flight control signals or commands in response to at least one of i) pivoting movements of the primary inceptor member around each of two independent maneuvering axes, ii) forces acting on or via the primary inceptor member in pivoting directions with respect to each of the maneuvering axes and iii) lateral flexing or bending of the primary inceptor member;
  a secondary inceptor member having an actuating portion, at which the secondary inceptor member can be manually actuated by a pilot's thumb, wherein the secondary inceptor member is mounted at a secondary inceptor member base relative to an upper mounting portion of the primary inceptor member opposite to the primary inceptor member base; and
  a secondary sensor assembly which is provided to generate electronic flight control signals or commands in response to at least one of i) pivoting movements of the secondary inceptor member around each of two independent maneuvering axes associated to the secondary inceptor member, ii) forces acting on or via the secondary inceptor member in pivoting directions with respect to each of the maneuvering axes, and iii) lateral flexing or bending of the primary inceptor member.

According to the invention, the flight control computer system is configured to effect the flight control in a primary control mode based on flight control signals or commands corresponding to or being based on the electronic flight control signals or commands generated by the primary sensor assembly of the inceptor apparatus and to effect the flight control in a secondary control mode based on flight control signals or commands corresponding to or being based on the electronic flight control signals or commands generated by the secondary sensor assembly of the inceptor apparatus.

According to the invention, the secondary inceptor member provides a redundant method for pilot input in case that the pilot input by means of the primary inceptor member fails for some reason. Therewith a pilot control system for a single pilot aircraft may be provided, which has two sidesticks in the form of a respective inceptor apparatus according to the invention, which are located at each side of the pilot. The secondary inceptor members, which may be provided in the form of a so-called thumb joystick (briefly "thumbstick"), are located on the respective primary inceptor member or stick member for being operated by the thumb of the pilot. These secondary inceptor members may be selected by the pilot as the main control device by actuating some kind of further control member, for example some sort of "stick failed switch", which could be located at an appropriate place, for example on the grip of the sidestick or the sidestick base or the apparatus base.

For achieving at least one of these objects, the invention, according to a second aspect, further provides an inceptor apparatus for an aircraft, comprising:
  an apparatus base;
  a primary inceptor member provided in the form of a stick member having a grip portion, at which the stick member can be gripped by a pilot's hand, wherein the primary inceptor member is mounted at a primary inceptor member base relative to the apparatus base; and
  a primary sensor assembly which is provided to generate electronic flight control signals or commands in response to at least one of i) pivoting movements of the primary inceptor member around each of two independent maneuvering axes, ii) forces acting on or via the primary inceptor member in pivoting directions with respect to each of the maneuvering axes and iii) lateral flexing or bending of the primary inceptor member.

According to the invention, the inceptor apparatus further comprises:

a secondary inceptor member having an actuating portion, at which the secondary inceptor member can be manually actuated by a pilot's thumb, wherein the secondary inceptor member is mounted at a secondary inceptor member base relative to an upper mounting portion of the primary inceptor member opposite to the primary inceptor member base; and a secondary sensor assembly which is provided to generate electronic flight control signals or commands in response to at least one of i) pivoting movements of the secondary inceptor member around each of two independent maneuvering axes associated to the secondary inceptor member, ii) forces acting on or via the secondary inceptor member in pivoting directions with respect to each of the maneuvering axes, and iii) lateral flexing or bending of the primary inceptor member.

The secondary inceptor member can favorably be used for providing a redundant method for pilot input in case that the pilot input by means of the primary inceptor member fails for some reason. Therewith a pilot control system for a single pilot aircraft may be provided, which has two sidesticks in the form of a respective inceptor apparatus according to the invention, which are located at each side of the pilot. The secondary inceptor members, which may be provided in the form of a so-called thumb joystick (briefly "thumbstick"), are located on the respective primary inceptor member or stick member for being operated by the thumb of the pilot. These secondary inceptor members may be selected by the pilot as the main control device by actuating some kind of further control member, for example some sort of "stick failed switch", which could be located at an appropriate place, for example on the grip of the sidestick or the sidestick base or the apparatus base.

According to the invention, lightweight redundancy and intuitive control by the pilot is achieved. Lower weight of the aircraft contributes to an increased range of the aircraft, which is an important factor for electrically powered aircrafts.

Various well-known implementations of control stick, sidesticks, thumbsticks, control knobs and the like may applied to realize the primary and secondary inceptor members.

For example, the primary inceptor member may be rigidly attached at its primary inceptor member base to the apparatus base and may comprise an elongated flexible primary shaft portion to which a plurality of primary strain gauges of the primary sensor assembly is attached in an angular distributed manner, such that the primary strain gauges provide electrical signals in response to lateral bending or flexing of the elongated flexible primary shaft portion. Therewith the primary inceptor member would be of the so-called "stiff-stick" type.

Correspondingly, the secondary inceptor member may be rigidly attached at its secondary inceptor member base to the upper mounting portion of the primary inceptor member and may comprise an elongated flexible secondary shaft portion to which a plurality of secondary strain gauges of the secondary sensor assembly is attached in an angular distributed manner, such that the secondary strain gauges provide electrical signals in response to lateral bending or flexing of the elongated flexible secondary shaft portion. Therewith the secondary inceptor member would be of the so-called "stiff-stick" type.

According to an alternative favorable embodiment, the primary inceptor member is moveably mounted at its primary inceptor member base relative to the apparatus base, by means of a primary multiple degree of freedom assembly, such that the primary inceptor member can pivotably move around the two independent maneuvering axes associated to the primary inceptor member.

Correspondingly, the secondary inceptor member may be moveably mounted at its secondary inceptor member base relative to the upper mounting portion of the primary inceptor member by means of a secondary multiple degree of freedom assembly, such that the secondary inceptor member can pivotably move around the two independent maneuvering axes associated to the secondary inceptor member.

It shall not be ruled out, that the primary multiple degree of freedom assembly provides for at least one further degree of freedom of movement, for example a rotational movement of the primary inceptor member around a longitudinal axis substantially perpendicular to the maneuvering axes, as is as such known from US 2008/0011905 A1 and U.S. Pat. No. 3,771,037. In this way, a convenient way to control a rolling movement of the aircraft on ground may be provided, for example.

Favorably, the primary inceptor member may be provided in the form of a handle, which can be grasped by a pilot's hand at its grip portion. An example of the shape of a known handle, which may be adapted for being used in the context of the present invention, is shown in US 2008/0011905 A1. Alternatively, the primary inceptor member may be an elongated member substantially longer than its grip portion, at which the pilot's hand will normally grasp the primary inceptor member.

As already mentioned, the secondary inceptor member may be provided in the form of thumbstick (or thumb stick). However, the secondary inceptor member may alternatively be provided in the form of a thumbknob (or thumb knob), for example. In the end, any kind of control element is suitable, which can be actuated at its actuating portion by the thumb of the/a pilot's hand grasping the primary inceptor member at its grip portion with the other fingers of the pilot's hand. The control element, preferably in form of a thumbstick or thumbknob, may be mounted pivotably moveable with respect to two independent maneuvering axes, as mentioned.

To advantage, the inceptor apparatus may comprise at least one further manually operable control member for generating at least one further electronic control signal or command. The or at least one further manually operable control member may be located on the primary inceptor member or a surface of the apparatus base. Such a manually operable control member may be used as the mentioned "stick failed switch" for selecting the secondary inceptor member for the main control.

The primary sensor assembly may be arranged within the apparatus base, preferably integrated with the primary multiple degree of freedom assembly.

The secondary sensor assembly may be arranged within the upper mounting portion of the primary inceptor member, preferably integrated with the secondary multiple degree of freedom assembly.

The primary inceptor member as well as the secondary inceptor member may be either passive or active. For a passive primary inceptor member it is proposed that the apparatus comprises a passive primary force-feedback assembly, which is provided to apply counter forces to the primary inceptor member opposite to a respective pivoting displacement applied to the primary inceptor member with respect to each of its maneuvering axes, wherein the passive primary force-feedback assembly applies the counter forces according to a predetermined force-feel characteristic.

For an active primary inceptor member it is proposed that the apparatus comprises an active primary force-feedback assembly, which is provided to apply counter forces to the primary inceptor member opposite to a respective pivoting force or displacement applied to the primary inceptor member with respect to each of its maneuvering axes, wherein the active primary force-feedback assembly applies the counter forces according to a variable force-feel characteristic as commanded by electronic control signals or commands received by the active primary force-feedback assembly.

The respective passive or active primary force-feedback assembly may be arranged within the apparatus base, preferably integrated with at least one of the primary multiple degree of freedom assembly and the primary sensor assembly.

For a passive secondary inceptor member it is proposed that the apparatus comprises a passive secondary force-feedback assembly, which is provided to apply counter forces to the secondary inceptor member opposite to a respective pivoting displacement applied to the secondary inceptor member with respect to each of its maneuvering axes, wherein the passive secondary force-feedback assembly applies the counter forces according to a predetermined force-feel characteristic.

For an active secondary inceptor member it is proposed that the apparatus comprises an active secondary force-feedback assembly, which is provided to apply counter forces to the secondary inceptor member opposite to a respective pivoting force or displacement applied to the secondary inceptor member with respect to each of its maneuvering axes, wherein the active secondary force-feedback assembly applies the counter forces according to a variable force-feel characteristic as commanded by electronic control signals or commands received by the active secondary force-feedback assembly.

The passive or active secondary force-feedback assembly may be arranged within the upper mounting portion of the primary inceptor member, preferably integrated with at least one of the secondary multiple degree of freedom assembly and the secondary sensor assembly.

In case that the secondary inceptor member is provided only for redundancy purposes as is preferred, a predetermined force-feel characteristics e.g. provided by a spring arrangement as passive secondary force-feedback assembly should in most cases be sufficient and favorable for reducing the complexity and installation space requirements.

According to a third aspect, the invention provides a flight control system for an aircraft, which comprises a flight control computer system and at least one inceptor apparatus, the latter as provided by the invention according to the second aspect.

According to the first and third aspect of the invention, possibly two such inceptor apparatus may belong to the flight control system e.g. for providing a left and a right sidestick of the pilot user interface. According to the fly-by-wire approach, the inceptor apparatus or respective inceptor apparatus will be electronically or optically connected with the flight control computer system. The flight control computer system is configured to effect a flight control of the aircraft based on flight control signals or commands received from the inceptor apparatus or respective inceptor apparatus. The flight control effected by the flight control computer system typically comprises at least one of controlling flight control surfaces of the aircraft, controlling one or plural engines of the aircraft and controlling actuators of the aircraft. Further, a ground control of the aircraft, typically comprising a wheel speed control and a wheel steering control, can be effected by flight control computer system based on pilot's commands given by means of the inceptor apparatus or respective inceptor apparatus, namely based on ground control signals or commands received from the inceptor apparatus or respective inceptor apparatus.

As already mentioned and proposed according to the first aspect of the invention, for providing the favorable redundancy considered in the foregoing, the flight control computer system may be configured a) to effect the flight control in a primary control mode based on flight control signals or commands corresponding to or being based on the electronic flight control signals or commands generated by the primary sensor assembly of the inceptor apparatus and b) to effect the flight control in a secondary control mode based on flight control signals or commands corresponding to or being based on the electronic flight control signals or commands generated by the secondary sensor assembly of the inceptor apparatus.

One may appropriately define the mentioned redundancy as follows: The primary control mode preferably is a normal control mode, in which the flight control is based on flight control signals or commands corresponding to or being based on the electronic flight control signals or commands generated by the primary sensor assembly of the inceptor apparatus, but is not based on flight control signals or commands corresponding to or being based on the electronic flight control signals or commands generated by the secondary sensor assembly of the inceptor apparatus, and the secondary control mode preferably is a redundancy control mode, in which the flight control is based on electronic flight control signals or commands corresponding to or being based the electronic flight control signals or commands generated by the secondary sensor assembly of the inceptor apparatus, but is not based on flight control signals or commands corresponding to or being based on the electronic flight control signals or commands generated by the primary sensor assembly of the inceptor apparatus.

The flight control computer system may favorably be configured to switch automatically between the primary control mode and the secondary control mode based on at least one of i) monitoring at least one condition related to the inceptor apparatus, ii) at least one flight control signal or command received from the inceptor apparatus and iii) lack of at least one control signal or command to be received from the inceptor apparatus.

In this context, it is further proposed that a redundancy management functionality of the flight control computer system or a separate redundancy management controller of the flight control system, possibly of the inceptor apparatus, is configured to switch automatically between the primary control mode and the secondary control mode based on at least one of i) monitoring at least one condition related to the inceptor apparatus, ii) at least one flight control signal or command received from the inceptor apparatus, iii) lack of at least one control signal or command to be received from the inceptor apparatus, iv) electronic flight control signals or commands generated by the primary sensor assembly and v) electronic flight control signals or commands generated by the secondary sensor assembly.

Preferably, the flight control computer system or the redundancy management functionality of the flight control computer system or the redundancy management controller is configured to recognize at least one failover condition of the inceptor apparatus, wherein the at least one failover condition is related to at least one of the primary sensor assembly and the primary control mode and indicates a possible impairment or failure to effect the flight control based on the electronic flight control signals or commands generated by the primary sensor assembly of the inceptor apparatus; and preferably is configured to initiate or effect a switching over from the primary control mode to the secondary control mode upon recognizing at least one failover condition. However, it is not ruled out that this switching over is to be commanded by the pilot in a suitable manner, e.g. manually by actuating a suitable control member, typically upon receiving an acoustic or/and visual failover alarm.

In this context, it is further proposed that of the primary sensor assembly and the secondary sensor assembly at least the primary sensor assembly is a redundant sensor assembly, which is configured to generate redundant electronic flight control signals or commands, preferably at least threefold redundant electronic flight control signals or commands.

To advantage, the redundant sensor assembly may have for each of the two independent maneuvering axes at least two, preferably at least three independent sensors, which are configured to generate independent electronic flight control signals or commands, wherein the redundant electronic flight control signals or commands are based on or include said generated independent electronic flight control signals or commands.

To advantage, a/the redundancy management functionality of the flight control computer system or a/the separate redundancy management controller of the flight control system, possibly of the inceptor apparatus, may be configured to monitor the redundant electronic flight control signals or commands for the occurrence of at least one predetermined condition comprising at as least one of a failure condition and a discrepancy condition, and is further configured to respond to such an occurrence of at least one predetermined condition by at least one of
  i) mitigating at least one of a failure and a discrepancy within the redundant electronic flight control signals or commands,
  ii) determining the electronic flight control signals or commands to be used as basis for the flight control, and
  iii) recognizing a/the failover condition of the inceptor apparatus, wherein the failover condition is related to at least one of the primary sensor assembly and the primary control mode, and preferably automatically switching from the primary control mode to the secondary control mode upon recognizing the failover condition.

Generally, it is proposed that the flight control system comprises at least one of a visual and acoustic signaling device to indicate at least one of i) the current active control mode of the primary control mode and the secondary control mode, ii) a switch over from the primary control mode to the secondary control mode and iii) the recognition of a/the failover condition.

In this context, it is further proposed that the flight control computer system is configured to switch between the primary control mode and the secondary control mode based on at least one further control signal or command received from the inceptor apparatus. For example, the flight control computer may be switched between the primary control mode and the secondary control mode by manually operating a/the control member of the inceptor apparatus.

According to a preferred embodiment, the control member is a movable guard member, which blocks at least one of manual access to the secondary inceptor member and an actuation of the secondary inceptor member in a blocking position and enables manual actuation of the secondary inceptor member by a pilot's thumb in an enablement position.

To advantage, the flight control computer system may be configured to control at least one active force-feedback assembly of the inceptor apparatus.

As already mentioned, the flight control system may comprise a first inceptor apparatus according to the second aspect of the invention and a second inceptor apparatus according to the second aspect of the invention. Preferably, the first and second inceptor apparatus are located on a left and right side of a pilot's seat.

To advantage, the redundancy of the user interface provided by the respective inceptor apparatus is provided independently for each inceptor apparatus. To this end, it is proposed i) that the flight control system is configured to effect the flight control alternatively according to the primary or secondary control mode based on flight control signals or commands received from the first inceptor apparatus independently of whether the flight control is currently effected according to the primary or secondary control mode based on flight control signals or commands received from the second inceptor apparatus, and ii) that the flight control computer system is configured to effect the flight control alternatively according to the primary or secondary control mode based on flight control signals or commands received from the second inceptor apparatus independently of whether the flight control is currently effected according to the primary or secondary control mode based on flight control signals or commands received from the first inceptor apparatus.

According to a fourth aspect, the invention provides an aircraft comprising a flight control system according to the second aspect of the invention. The aircraft may be a single pilot aircraft. The aircraft may have a vertical take-off and landing (VTOL) capability. The aircraft may be of the canard type.

However, the invention with its four aspects may be applied to any kind of aircraft, in particular also to all types of aircraft, which were considered in the foregoing description of the technical background.

BRIEF DESCRIPTION OF THE DRAWINGS

and FIG. 5bX) is a cross-sectional view of the "stiff stick" showing four strain gauges attached to the "stiff stick".

DETAILED DESCRIPTION

Figure 1:
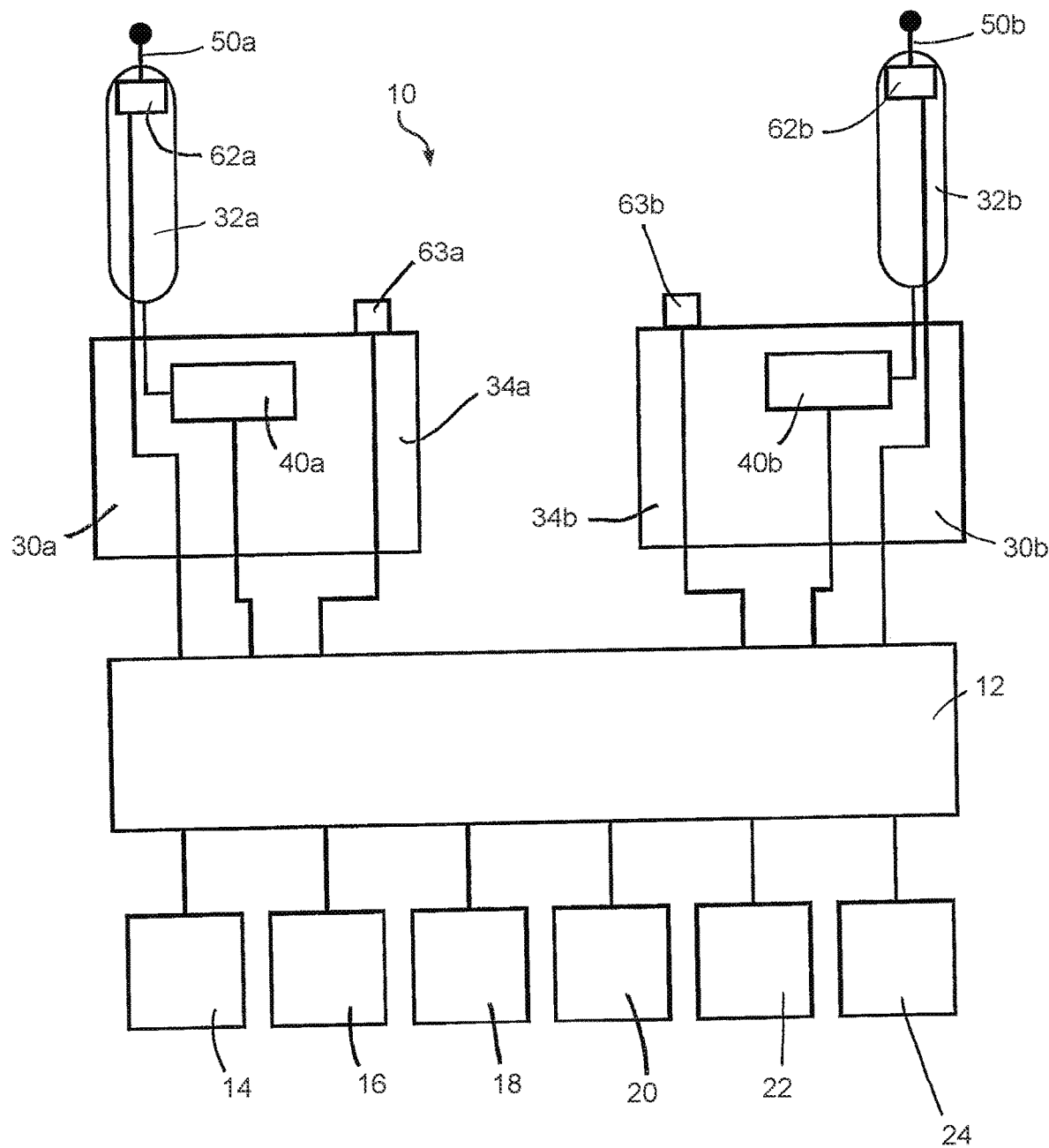
FIG. 1 shows schematically a flight control system of an aircraft having a redundant user interface for the pilot.
Figure 2:
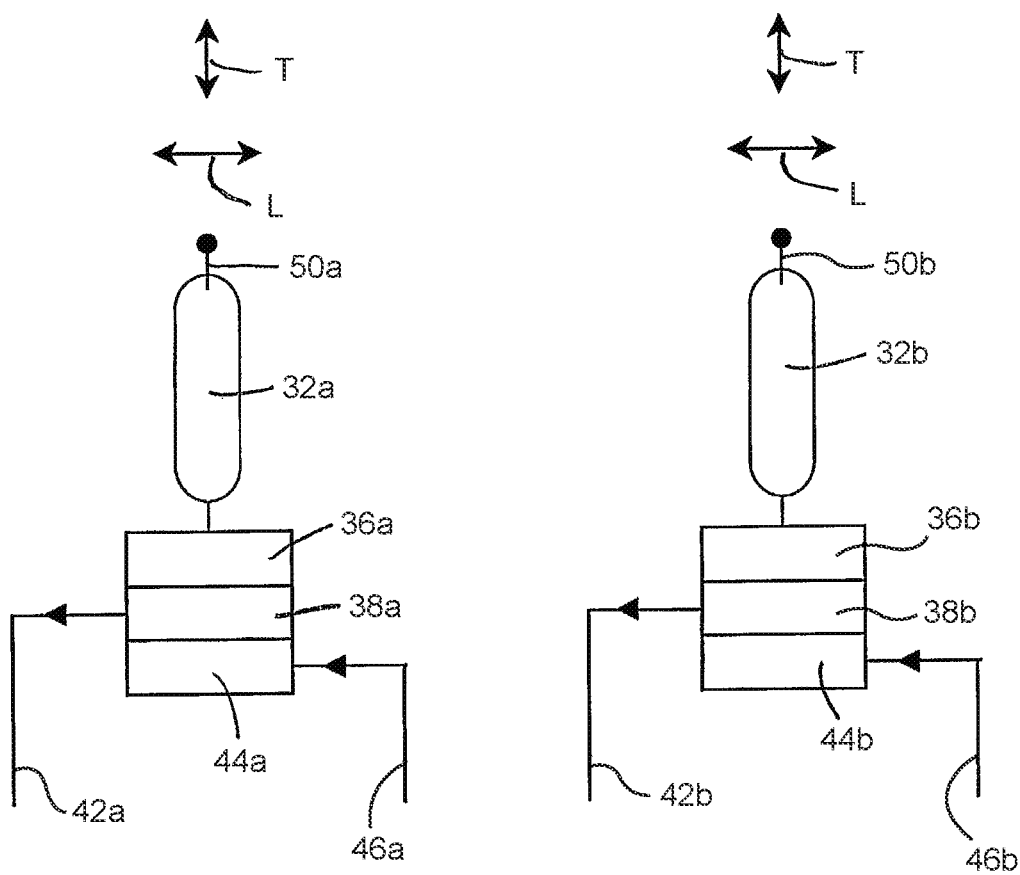
FIG. 2 illustrates schematically a left sidestick and a right sidestick of the user interface with respect to pivoting control movements about two orthogonal maneuvering axes and associated assemblies for allowing this movability and for generating electronic flight control signals or commands reflecting such control movements.
Figure 3:
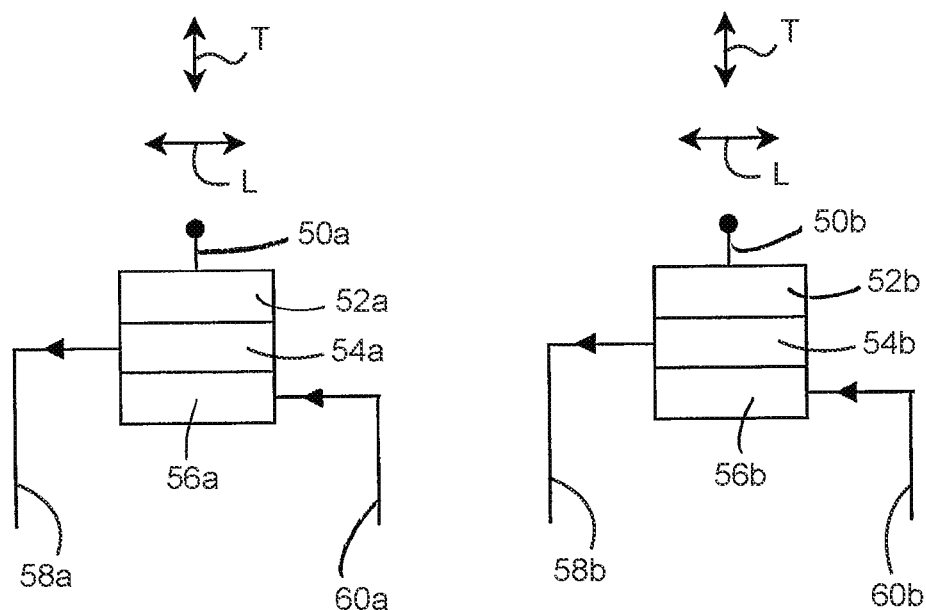
FIG. 3 illustrates schematically a left thumbstick and a right thumbstick of the user interface with respect to pivoting control movements about two orthogonal maneuvering axes and associated assemblies for allowing this movability and for generating electronic flight control signals or commands reflecting such control movements.

FIGS. 1 to 3 show and illustrate schematically a non-limiting example for a flight control system 10 of the present invention. The flight control system has a flight control computer system 12, which may be realized according to conventional concepts, in particular concepts, which provide for redundancy. An example is a conventional triplex architecture having three redundant flight control computers, which are connected redundantly, e.g. via three networks, with the pilot user interface on the one hand and elements and devices of the aircraft to be controlled based on the pilot's commands on the other hand. As examples for conventional redundancy concepts, it may be referred to U.S. Pat. Nos. 7,337,044 B2, 8,935,015 B2 and 8,818,575 B2.

In FIG. 1, various components of the aircraft are represented schematically by elements 14 to 24, which may represent various sensors, actuators (such as actuators for controllably moving flight control surfaces such as flaps and the like), propulsion engines and the like. For simplicity, these elements are shown to be directly connected with the flight control computer system 12, which is indeed an option. However, it is preferred to use instead an avionic backbone network, like AFDX/ARING 664 or ARINC 629, or a bus system, e.g. a CAN bus system, for optically or electrically linking the various components with the flight control computer system 12. This linking, directly or via a respective backbone network or bus, may be unidirectional or bidirectional, depending on the respective device.

The flight control system 10 further comprises a pilot user interface, which may include a left sidestick apparatus 30a and a right sidestick apparatus 30b, the left sidestick apparatus having a left sidestick 32a and the right sidestick apparatus having a right sidestick 32b. Both sidesticks can be pivoted in a left-right direction, about a first maneuvering axis extending at least roughly in a longitudinal direction of the aircraft and in a forward-backward direction, about a second maneuvering axis extending at least roughly in a traverse direction of the aircraft, preferably orthogonal to the first maneuvering axis.

The pivoting movability of the respective sidestick about the first maneuvering axis is represented in FIG. 2 by arrows L and the pivoting movability of the respective sidestick about the second maneuvering axis is represented in FIG. 2 by arrows T, which are shown in FIG. 2 to extend vertically in the drawing plane of the figure for representing the pivoting movement in the forward-backward direction, which is orthogonal to the drawing plane.

For providing this movability about the two independent maneuvering axes, the respective sidestick is mounted relative to an apparatus base or apparatus housing 34a or 34b of the respective sidestick apparatus by means of a multiple degree of freedom assembly 36a and 36b. Associated to the two sidesticks is also respective sensor assembly 38a and 38b, which may be integrated with the respective multiple degree of freedom assembly. These sensor assemblies 38a and 38b each require at least two sensors, one responsive to a pivoting movement of the sidestick in the left-right direction and the other responding to a pivoting movement on the sidestick in the forward-backward direction. Alternatively, the sensor assembly may respond to a pivoting force applied via the sidestick and acting in the left-right direction or the forward-backward direction. One may provide that the sensor assembly responses to both, namely to the positioning of the sidestick in the left-right direction and in the forward-backward direction as well as to the pivoting forces acting in these directions as applied to or by the sidestick.

FIG. 1 illustrates for both sidesticks only a sensor subassembly of the respective sensor assembly 38a and 38b, namely one or plural sensors 40a and 40b, which respond to the pivoting positioning of the sidestick 32a and the sidestick 32b in the forward-backward direction. At least one further sensor will be required, which responds to the pivoting positioning of the sidestick in the left-right direction.

The electronic flight control signals or electronic flight control commands generated by the sensor assembly 38a and sensor assembly 38b are transmitted via electronic or optical connection links 42a and 42b to the flight control computer system 12.

In principle, a predetermined static force-feel characteristic is sufficient for the two sidesticks, which can appropriately be achieved by an elastic spring arrangement or similar of a passive force-feedback assembly, possibly just return springs or the like of the respective sensors. However, a favorable active force-feel characteristic may be provided for the two sidesticks by suitable force-feedback assemblies 44a and 44b, which receives suitable control signals or commands from the flight control computer system 12 via connection links 46a and 46b. The force-feedback assemblies 44a and 44b may be integrated with at least one of the multiple degree of freedom assembly 36a and the sensor assembly 38b and with at least one of the multiple degree of freedom assembly 36b and the sensor assembly 38b, respectively.

Both control sticks (sidesticks) 32a and 32b are provided with a secondary inceptor member 50a and 50b e.g. in the form of a thumbstick or thumbknob. This secondary inceptor member is mounted to an upper mounting portion of the respective sidesticks, to be pivotably movable with respect to two independent maneuvering axes, which preferably are parallel to the two maneuvering axes of the sidestick, if the sidestick is in a home or neutral position, in which the sidestick is not deflected in the left-right direction or the forward-backward direction, typically against resilient or active return forces acting on the sidestick, e.g. from the respective active or passive force-feedback assembly.

FIG. 3 illustrates the pivoting movability of the secondary inceptor members 50a and 50b based on the assumption that the respective sidestick 32a and 32b is located in its home or neutral position.

Analogous to the realization for the sidesticks, the secondary inceptor members, in particular the thumbsticks 50a and 50b, are movable about two independent maneuvering axes by means of a multiple degree of freedom assembly 52a and 52b. In the home or neutral position of the respective sidestick, these axes may favorably correspond essentially to the two maneuvering axes of the respective sidestick, as follows:

Both thumbsticks can be pivoted in a left-right direction, about a first maneuvering axis extending at least roughly in a longitudinal direction of the aircraft, and in a forward-backward direction, about a second maneuvering axis extending at least roughly in a traverse direction of the aircraft, preferably orthogonal to the first maneuvering axis.

The pivoting movability of the respective thumbstick about the first maneuvering axis is represented in FIG. 3 by arrows L and the pivoting movability of the respective thumbstick about the second maneuvering axis is represented in FIG. 3 by arrows T, which are shown in FIG. 3 to extend vertically in the drawing plane of the figure for representing the pivoting movement in the forward-backward direction, which is orthogonal to the drawing plane.

However, there are also other suitable possibilities, as is known as such from conventional pilot user interfaces. For example, both thumbsticks can be pivoted in a left-right direction, about a first maneuvering axis extending at least roughly in a longitudinal direction of the aircraft, and in an upward-downward direction, about a second maneuvering axis extending at least roughly in a traverse direction of the aircraft, preferably orthogonal to the first maneuvering axis. To this end, the thumbstick may protrude from an upper end section of the sidestick essentially in a horizontal direction towards the pilot, instead of protruding essentially upwardly from the upper end section of the sidestick, as is shown in the schematic figures.

Analogous to the sidesticks, a respective sensor assembly 54a and 54b is associated to each thumbstick, which responds to at least one of the pivot positioning of the thumbstick with respect to its two maneuvering axes and pivoting forces acting via the thumbstick in these pivoting directions. The sensor assemblies 54a and 54b may be integrated with the respective multiple degree of freedom assembly 52a and 52b.

In most cases it should be sufficient to have a predetermined static force-feel characteristic for the two thumbsticks 50a and 50b, such as can be obtained by means of a spring arrangement as passive force-feedback assembly, possibly by return springs of the sensors of the respective sensor assembly. However, it shall not be ruled out that also thumbsticks 50a and 50b are provided with an active force-feedback assembly 56a and 56b, which may be integrated with at least one of the multiple degree of freedom assembly 52a and the sensor assembly 54a and at least one of the multiple degree of freedom assembly 52b and the sensor assembly 54b, respectively.

Connection links analogous to the connection links 42a and 46a and the connection links 42b and 46b of FIG. 2 have associated the reference signs 58a and 60a and the reference signs 58b and 60b in FIG. 3.

The two thumbsticks 50a and 50b are mounted pivotably movable to the upper mounting portion of the sidestick 32a and the upper mounting portion of the sidestick 32b, as mentioned. The respective multiple degree of freedom assembly is integrated into this portion of the sidestick, together with the respective sensor assembly and, if provided, the respective force-feedback assembly. These sidesticks may be denoted as primary inceptor member 32a and primary inceptor member 32b.

In FIG. 1, a sensor subassembly of the respective sensor assembly 54a and 54b, namely at least one sensor responding to the pivoting positioning of the respective thumbstick in the forward-backward direction, is denoted as 62a and 62b, respectively. At least one further such sensor must be required for each thumbstick, which responds to the pivoting positioning of the thumbstick 50a and 50b in the left-right direction.

In principle, the two secondary inceptor members or thumbsticks 50a and 50b could be used for any kind of controlling of the aircraft, independently of the controlling to be done by means of the respective primary inceptor member or sidestick 32a and 32b. However, it is preferred that the secondary inceptor members 50a and 50b are provided for redundancy purposes, namely for being used by the pilot, if the control by means of the respective sidestick 32a and 32b fails for some reason.

In this case, it is favorable if the same control commands as assigned to the pivoting movements of the sidestick in the left-right direction and in the forward-backward direction are assigned to the respective thumbstick with respect to these pivoting directions.

For example, the pivoting movement of the left sidestick 32a as well as the left thumbstick 50a in the forward-backward direction may be assigned to a vertical movement control of the aircraft, namely movement of the aircraft in the upward and downward directions. The pivoting movement of the left sidestick 32a as well as the left thumbstick 50a in the left-right direction may be assigned to a turning control of the aircraft, namely turning movements of the aircraft leftwards and rightwards.

Further, the pivoting movement of the right sidestick 32b and the right thumbstick 50b in the forward-backward direction may be assigned to a longitudinal movement and speed control of the aircraft, namely movement and speed in the forward and backward direction. The pivoting movement of the right sidestick 32b as well as the right thumbstick 50b in the left-right direction may be assigned to a lateral movement control of the aircraft, namely movement of the aircraft laterally to the left direction and laterally to the right direction.

Figure 8:
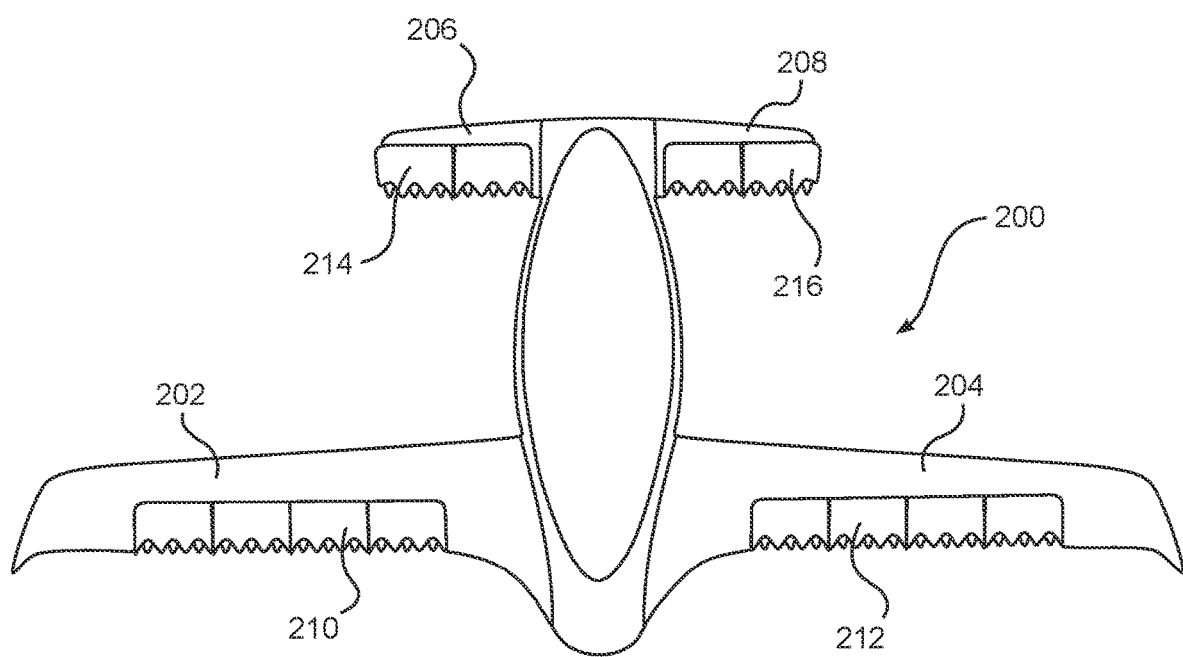
FIG. 8 is schematic top down view on a canard type aircraft, which may be realized as single pilot aircraft having VTOL capability and may be provided with the flight control system according to the present invention.

These assignments mentioned here as a non-limiting example refer to a possible realization for the canard-type aircraft shown in FIG. 8. Instead, the usual well-known assignments of flight control commands of a conventional user interface for a pilot may be assigned to the sidesticks and analogously to the thumbsticks, in particular in the case of conventional aircrafts having no vertical take-off and landing (VTOL) capability.

In case of the explained preferred redundancy, the flight control computer system 12 can operate in two alternative control modes with respect to the left sidestick apparatus 30a as well with respect to the right sidestick apparatus 30b, preferably independently for both of these sidestick apparatus. In a first or primary control mode the flight control computer system 12 effects the flight control based on the flight control signals or commands received from the sensor assembly (primary sensor assembly) 38a or 38b of the respective sidestick 32a or 32b. In a second or secondary control mode, the flight control computer system 12 effects the flight control on basis of the flight control signals or commands received from the sensor assembly (secondary sensor assembly) 54a or 54b of the respective thumbstick 50a or 50b.

The switching between the two control modes for the left sidestick apparatus 30a and for the right sidestick apparatus 30b could be done automatically by the flight control computer system, depending on certain inputs to the flight control computer system received via certain connection lines. However, one may alternatively provide that the switching over between the respective two control modes can be done only under the control of the pilot. Preferably, an automatic switching over by the flight control computer is combined with the possibility that the pilot can command actively to switch from the first or primary control mode to the second or secondary control mode and to switch from the second or secondary control mode to the first or primary control mode.

For allowing such a switching over by the pilot, the two sidestick apparatus 30a and 30b may be provided with a manually operable control element such as a control button 63a and 63b, which may be located on the surface of the apparatus base 34a and 34b, respectively, as shown as an example in FIG. 1. Alternatively, such a control element might be integrated in the sidestick 32a and the sidestick 32b, for example accessible by a finger of the pilot without removing the left or right hand from the respective sidestick. For example, such a control button could be embedded in a side surface of the respective sidestick.

It should be added, that both sidesticks 32a and 32b and both secondary inceptor members like the preferred thumbsticks 50a and 50b might be provided with redundancy concerning the sensor arrangements. Plural sensors or sensor pick-ups, which operate independently, may be provided for the pivoting degrees of movement about the respective two maneuvering axes.

Figure 4:
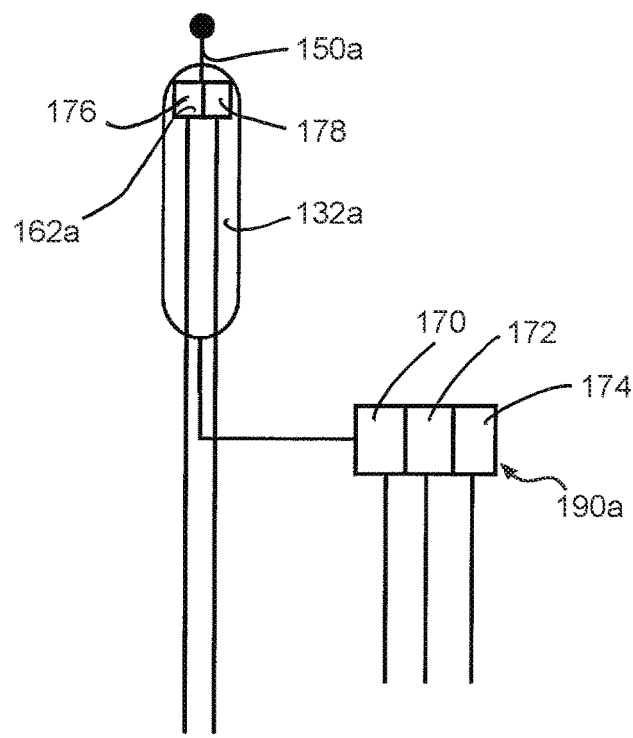
FIG. 4 illustrates the possibility that the respective sidestick and the respective thumbstick have associated redundant sensor assemblies.

FIG. 4 illustrates a corresponding example concerning the pivoting movability about the left-right maneuvering axis in the forward-backward direction. Assuming that the left sidestick is shown, this sidestick 132a has associated a sensor subassembly 190a comprising three independent positioning sensors (or force sensors) 170, 172 and 174, which respond to the pivoting movement (or pivoting force) in the forward-backward direction and which each are connected with the flight control computer system, possibly with a different one of at least three independent flight control computers of this flight control computer system.

Correspondingly, the secondary inceptor member or thumbstick 150a may have associated plural independent sensors, in the example of FIG. 4 two independent positioning sensors (or force sensors), which respond to the pivoting movement (or pivoting force) in the forward-backward direction and which each are connected with the flight control computer system, possibly with a different one of at least three independent flight control computers of this flight control computer system. The corresponding sub-sensor assembly 162a is shown in FIG. 4 with such two sensors 176 and 178. What is mentioned as possibility for the left sidestick and the left thumbstick applies analogously to the right sidestick and the right sidestick. If desired, of course a threefold or triple redundancy instead of the illustrated twofold or dual redundancy may be realized also for the two thumbsticks, and a twofold or dual redundancy instead of the illustrated threefold or triple redundancy may be provided also for the two sidesticks. If desired, even a higher degree of redundancy may be provided, e.g. fourfold redundancy.

Sensors as conventionally known in the art may be used, such as RVDTs (Rotary Variable Differential Transformer) or LVDTs (Linearly Variable Differential Transformer), potentiometers, hall sensors and strain gauges. For the sensors associated to the sidesticks, RVDTs or LVDTs are preferred, whereas for the thumbsticks sensor types requiring less installation space such as potentiometers, hall sensors and strain gauges might be more favorable.

Generally, the number of sensors used for each pivoting direction of the respective sidestick and the respective thumbstick should be selected as a function of the required integrity, availability and the reliability of the type of sensor being used, as well as other constrains which have to be observed.

For example, the thumbstick should be small enough that it can fit on the sidestick grip. Depending on the requirements of the regulator, a method of actively monitoring for failures in the sensors may be required to be implemented.

In general, when dealing with simple sensors such as potentiometers, it might be difficult to differentiate the output of a broken sensor from the output of a valid one, thus having two sensors increases the integrity, as they can be compared in a voter, but not the availability, since any failure in a single sensor would cause both sensors to be declared as failed. In this case, it is generally not possible to find out, which sensors failed without using heuristics that might end up being dangerous in corner cases. Therefore, the embodiments with respectively three sensors responding to the respective pivoting movement about the two maneuvering axes appear to be preferable for the respective sidestick as well as for the respective thumbstick.

On the other hand, if the thumbstick is to be used only as redundant alternate (secondary) inceptor member in the case that the primary inceptor member in form of the sidestick does not function properly, a lower degree of redundancy or even no redundancy might be considered to be sufficient, depending on the regulations to be met.

An non-limiting illustrative example of a suitable realization is given in the following:

The control can switch over to the thumbsticks due to two different types of failure:
  1) Failures that the flight control system (FCS) can recognise automatically and
  2) failures (usually mechanical in nature) that only the pilot can detect.

The automatic detection of failures relies on the fact that the position of each of the main axis of the sidestick is read by e.g. three separate sensors (the number of sensors may vary in different embodiments). That means that, for each axis, three different measurements are made (this is typical for civil FBW systems, where there are either three or four sensors per axis).

By checking the values of each sensor and comparing the sensors among themselves the FCS software is able to isolate (i.e. detect the failed sensor and ignore its values) several failures. These cases are handled transparently to the pilot, and they will not see any message or notice any effect while in flight.

In some cases, the FCS is able to detect that something is failed but it is not able to isolate the failure. One example of this is when the three sensors disagree, or when one sensor has already been declared as failed but the two remaining sensors disagree. In cases like this, the FCS may favorably be configured to automatically switch control to the thumbsticks and alert the pilot through a message. The signals coming from the main sensors (i.e. the primary sensor assembly, which is associated to the sidestick) are ignored after that.

Methods to detect failures in redundant sensors in fly-by-wire (FBW) systems and to reconfigure the system are quite well known (such a software component is usually called a data voter), and there are several different methods to do it, which are as such well know in the art.

However, it makes sense to describe a non-limiting example of a decision table:

| Sensor status | Behaviour of redundancy management logic |
|---|---|
| All sensors valid and comparing | 1) Use the median of the sensors |
| One sensor detected failed, two remaining sensors valid and comparing | 2) Use the median between the comparing and valid sensors |
| Two sensors detected failed, one valid | 3) Use the value of the valid sensor |

| Sensor status | Behaviour of redundancy management logic |
| --- | --- |
| Three sensors detected failed | 4) Loss of sensing on the axis. Switch to thumbstick |
| Three sensors valid and not comparing | 5) Loss of sensing on the axis. Switch to thumbstick |
| One sensor detected failed, two remaining sensors valid and not comparing | 6) Loss of sensing on the axis. Switch to thumbstick |

In case of the described embodiment, this may be done with respect to both sensor assemblies 38a and 38b associated to the two maneuvering axes of the left sidestick 32a and right side stick 32b of the respective left or right sidestick (inceptor) apparatus 30a and 30b. The FCS software determines the respective electronic flight control signal or command to be used (cases 1), 2) and 3)), mitigates a failure or discrepancy (cases 2) and 3)) and recognizes a failover condition which calls to switch to the respective thumbstick (cases 4), 5) and 6)).

Figure 5:
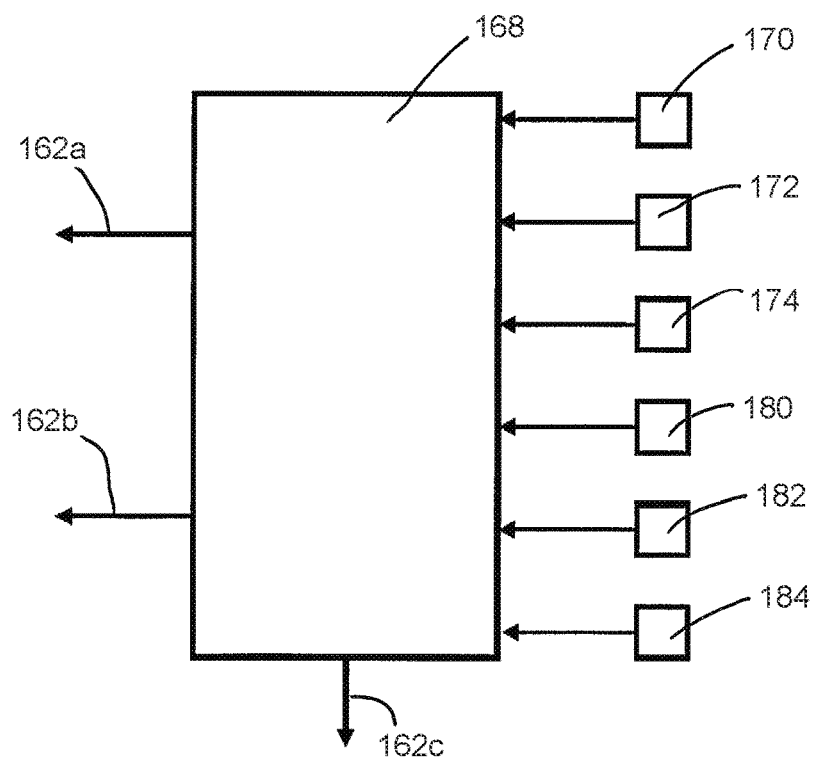
FIG. 5 illustrates a redundancy management functionality or redundancy management controller of the flight control system.

FIG. 5 illustrates a corresponding redundancy management functionality of the FCS software and therewith the flight control computer system 12 or a corresponding redundancy management controller of the flight control system, which might be provided separately to the flight control computer system 12, possibly as a component of a sidestick (inceptor) apparatus.

Concerning the left sidestick (inceptor) apparatus 30a, the redundancy management functionality or controller 168 receives the sensor outputs of the three independent sensors 170, 172 and 174 of the sensor subassembly 190a (c.f. FIG. 4) being associated to one of the two independent maneuvering axes and issues the resulting mitigated or determined sensor value to be used at 168a, and the redundancy management functionality or controller 186 receives the sensor outputs of the three independent sensors 180, 182 and 144 of the other sensor subassembly being associated to other of the two independent maneuvering axes and issues the resulting mitigated or determined sensor value to be used at 168b. The occurrence of a failover condition is indicated at 168c in the form of a failover signal or command.

A corresponding redundancy management functionality or controller may be provided for the right sidestick (inceptor) apparatus 30b. Alternatively, a common redundancy management functionality or controller may be provided which is commonly associated to the left sidestick (inceptor) apparatus 30a and to the right sidestick (inceptor) apparatus 30b and receives the sensor outputs associated to both sidestick 32a and 32b.

If a left and a right inceptor apparatus are provided, as in the described embodiment, this redundancy management could be done independently for each of the two sidestick apparatus 30a and 30b, so that in case of a failover, the pilot would control the aircraft using the sidestick of one of the two sidestick apparatus 30a and 30b and using the thumbstick of the other of the two sidestick apparatus 30a and 30b.

However, it may be more intuitive for the pilot to use either the two sidesticks 32a and 32b or the two thumbsticks 50a and 50b, so that one may provide that the occurrence of a failover condition with respect to one of the two sidesticks 32a and 32b results in a failover to both thumbsticks 50a and 50b.

The concept of two or more sensor "comparing" is usually implemented by ensuring that all sensors are at a certain distance from each other (e.g., for inceptors that all sensors agree to within 0.5°), after some sort of filtering (to include resiliency to noise etc).

For a sensor to be "detected failed", an analysis considering only the value produced by the sensor is used. With favorable inceptors, e.g. of the kind using RVDTs (Rotary Variable Differential Transformers), it is possible to monitor the output voltages and also it is possible to monitor if the sensor output is within the specified range.

Figure 7:
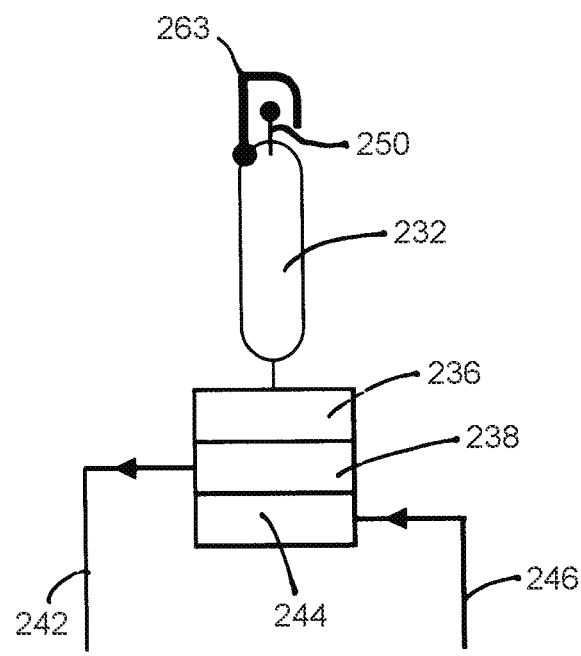
FIG. 7 illustrates schematically a sidestick having a control member in the form of a guard member which shields a thumbstick in a guarding or blocking position and enables manual actuation of the thumbstick in an enablement position.

In case of mechanical failures, such as a jam, there is no way for the flight control system to know that there is a failure, as all sensors will be working properly and agreeing. In that case, the pilot has to use the stick failed switch to inform the FCS that the main axes are failed somehow. After pressing the control button 63a or 63b (c.f. FIG. 1) or another kind of stick failed switch, or—in another preferred design—opening a guard member covering the thumb member (c.f. FIG. 7), the FCS will switch control over to the thumbstick and will ignore the commands from the main sensors associated to the sidestick.

Figure 6:
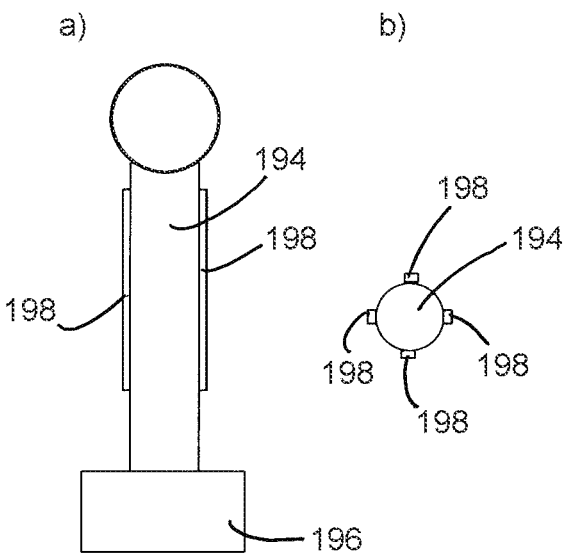
FIG. 6 illustrates a so-called "stiff stick" which can be provided as left or right sidestick or as left or right thumb stick, wherein FIG. 5$a$X) is a side view of the "stiff stick"

FIG. 6 shows schematically an elongated inceptor member of the so-called "stiff-stick" type, as is as such known e.g. from U.S. Pat. No. 3,454,920. Both the primary inceptor member and the secondary inceptor member may be provided in the form of such a "stiff stick". A particularly preferred embodiment has a primary inceptor member as schematically shown in FIGS. 1 and 2, combined with a secondary inceptor member or thumbstick of the "stiff-stick" type, as illustrated in FIG. 6.

The inceptor member of FIG. 6 comprises an elongated flexible shaft or stick member 194, which is rigidly attached at its lower end to a base 196. In case of a primary inceptor member or sidestick, this base will belong to the apparatus base. In case of a secondary inceptor member or thumbstick, this base will belong to the upper end of the primary inceptor member or sidestick. In this case this base may be formed by the ground of a recess in the upper end of the primary inceptor member, as is as such known from U.S. Pat. No. 3,454,920.

To the shaft or stick member 194, a plurality of strain gauge elements 198 are mounted in an angular distributed manner on the outer circumference surface of the shaft or stick member 15. These strain gauge elements, which may be of the solid-state or semiconductor type, respond to bending and flexing of the shaft or stick member with electrical signals, which are transmitted via suitable wiring to the flight control computer system.

FIG. 7 shows an embodiment of a sidestick 232 with an integrated thumbstick 250, like the embodiments of FIG. 2. The same reference signs as in this figure are used, increased by 200 and without the appendage "a" or "b". A guard member 263 shields the thumbstick in the shown position, which is a guarding or blocking position, so that the thumbstick cannot be manually actuated. The guard member is swivel-mounted to an upper surface of the sidestick 232. Lifting the guard member 263 from the thumbstick 250 by swiveling the guard member 250 upwardly into an enablement position enables manual access to the thumbstick 250 for manual actuation by a pilot's thumb. The guard member 263 preferably is a control member like the control buttons 63a and 63b, which commands the normal or first flight control mode via the sidestick in its guarding or blocking position and commands a redundancy or second flight control mode via the thumb stick in its enablement position.

Accordingly, the added guard member provides that to access the thumbstick lifting of the guard member is needed, and this automatically deactivates the processing of the signals from the primary sensors of the primary inceptor or sidestick (the signals of the primary sensors may just be ignored) and activates the processing of the signals from the secondary sensors of the secondary inceptor or thumbstick.

FIG. 8 illustrates a canard-type aircraft as a non-limiting example, to which the present invention may be applied. The canard-type aircraft 200 has a fixed left aft or main wing 202 and a fixed right aft or main wing 204 at a aft portion of the aircraft and a fixed left front or canard wing 206 and a fixed right front or canard wing 208 at a front portion of the fuselage of the aircraft. Each wing is provided with an array of plural flaps 210, 212, 214 and 216, respectively. For example, six flaps per front wing or canard and twelve flaps per aft wing or main wing could be provided. The shown embodiment has two flaps per front wing or canard and four flaps per aft wing or main wing.

These flaps are mounted pivotably or moveably to the respective wing and can be pivoted about a pivoting axis or moved with a pivoting movement component by a respective electric actuator arrangement, preferably independently of each other for each flap. Each flap can be pivoted between an upper first operational position and a lower second operational position. Each flap may assume a position of minimum or vanishing inclination with respect to a longitudinal axis of the aircraft, possibly the upper first operational position, and a position of maximum downward inclination with respect to the longitudinal axis of the aircraft, possibly the lower second operational position. However, if the position of maximum downward inclination corresponds to a vertical orientation of the flap, the lower second operational position may alternatively be a position beyond the position of maximum downward inclination, so that the flap points slightly forward.

To each of these flaps at least one propulsion engine in the form of a ducted propeller, which is operated electrically, is mounted. The ducted propellers preferably are mounted to an upper surface of the respective flap. Alternatively, the propulsion engines may be integrated into a respective flap in a manner, that an air channel of the respective propulsion engine, in which the respective ducted propeller rotates, is located above and aligned with an upper surface of the respective front wing or aft wing.

In the shown embodiment, the flaps are provided with propulsion modules, into which plural propulsion engine in the form of a ducted propeller are integrated. For example, such a propulsion module may include there such propulsion engines, so that each flap is provided with three propulsion engines in the form of a respective ducted propeller.

In an alternative embodiment, more flaps per wing are provided, and each flap is provided with only one propulsion engine per flap in the form of a respective ducted propeller.

Preferably, the flaps may assume a position corresponding to the lower second operational position or another operational position between the first and the second operational positions, in which the ducted propellers provide only vertical thrust downwardly, which provides the aircraft with a vertical take-off and landing (VTOL) capability. In the upper first operational position or another operational position between the first and the second operational positions, in which the flaps extend in the longitudinal direction or at a minimum angle with respect to the longitudinal direction of the aircraft, the operating ducted propellers provide maximum forward thrust for the aircraft. The flaps operate not only for controlling the thrust direction of the propulsion engines or propulsion modules, but also as flight control surfaces influencing the movement of the aircraft in the air based on the usual aerodynamic principles.

According to the invention, the canard-type aircraft 200 is provided with a user interface according to the invention for the pilot, which comprises one or two sidesticks having a respective secondary inceptor member, such as shown in FIG. 1 to 3 or shown in FIG. 4. Alternatively, at least one of the respective primary and secondary inceptor members may be of the "stiff-stick" type, as illustrated in FIG. 6. As a further alternative, at least one sidestick with a guarded thumbstick as shown in FIG. 7 may be provided. Preferably, the canard-type aircraft has a flight control system according to the invention, such as the flight control system shown schematically in FIG. 1.

Based on the control inputs of the pilot by means of the two sidesticks and the two secondary inceptor members, in particular thumbsticks, the flight control computer system 12 controls the deflection angles of the flaps at the front wings and the aft wings and the thrust of the propulsion engines by controlling the rotation speeds of the ducted propellers. Preferably, the deflection angles of all flaps can be controlled independently of each other. Further, one may provide that the rotation speeds of all ducted propellers can be controlled independently of each other. This applies also to case, that propulsion modules as mentioned, each having plural ducted propellers as in the shown embodiment, are provided. However, in this case one may decide to provide for a collective control of the rotation speeds of the ducted propellers of each respective propulsion module.

It should be pointed out, that the user interface according to the invention and the flight control system according to the invention can be used favorably also in any kind of conventional aircraft, including aircrafts having no VTOL-capability.

An inceptor apparatus for an aircraft comprises a primary inceptor member provided in the form of a stick member having a grip portion, at which the stick member can be gripped by a pilot's hand, and a secondary inceptor member provided at an upper portion of the primary inceptor member and having an actuating portion, at which the secondary inceptor member can be manually actuated by a pilot's thumb. Both inceptor members have associated a respective sensor assembly which is provided to generate electronic flight control signals or commands in response to at least one of i) pivoting movements of the respective inceptor member around each of two independent maneuvering axes associated to the inceptor member, ii) forces acting on or via the respective inceptor member in pivoting directions with respect to each of the maneuvering axes, and iii) lateral flexing or bending of the respective inceptor member. According to one aspect of the invention, a flight control computer system for an aircraft has at least one such inceptor apparatus and is configured to effect the flight control in a primary control mode based on flight control signals or commands corresponding to or being based on the electronic flight control signals or commands generated by the primary sensor assembly of the inceptor apparatus and to effect the flight control in a secondary control mode based on flight control signals or commands corresponding to or being based on the electronic flight control signals or commands generated by the secondary sensor assembly of the inceptor apparatus.

Herewith also the following items are disclosed:
1. Flight control system (10) for an aircraft (200), comprising at least one inceptor apparatus (30a; 30b), which is electronically or optically connected with a flight control computer system (12), the flight control computer system (12) being configured to effect a flight control of the aircraft (200) based on flight control signals or commands received from the inceptor apparatus (30a; 30b);
wherein the inceptor apparatus (30a; 30b) comprises:
an apparatus base (30a; 30b);
a primary inceptor member (32a; 32b) provided in the form of a stick member having a grip portion, at which the stick member can be gripped by a pilot's hand, wherein the primary inceptor member is mounted at a primary inceptor member base relative to the apparatus base (34a; 34b);
a primary sensor assembly (38a; 38b; 198) which is provided to generate electronic flight control signals or commands in response to at least one of i) pivoting movements of the primary inceptor member (32a; 32b) around each of two independent maneuvering axes, ii) forces acting on or via the primary inceptor member in pivoting directions with respect to each of the maneuvering axes and iii) lateral flexing or bending of the primary inceptor member;
a secondary inceptor member (50a; 50b) having an actuating portion, at which the secondary inceptor member can be manually actuated by a pilot's thumb, wherein the secondary inceptor member is mounted at a secondary inceptor member base relative to an upper mounting portion of the primary inceptor member (32a; 32b) opposite to the primary inceptor member base; and
a secondary sensor assembly (54a; 54b; 198) which is provided to generate electronic flight control signals or commands in response to at least one of i) pivoting movements of the secondary inceptor member (50a; 50b) around each of two independent maneuvering axes associated to the secondary inceptor member, ii) forces acting on or via the secondary inceptor member in pivoting directions with respect to each of the maneuvering axes, and iii) lateral flexing or bending of the primary inceptor member;
wherein the flight control computer system (12) is configured to effect the flight control in a primary control mode based on flight control signals or commands corresponding to or being based on the electronic flight control signals or commands generated by the primary sensor assembly (38a; 38b; 198) of the inceptor apparatus (30a; 30b) and to effect the flight control in a secondary control mode based on flight control signals or commands corresponding to or being based on the electronic flight control signals or commands generated by the secondary sensor assembly (54a; 54b; 198) of the inceptor apparatus (30a; 30b).

2. Flight control system according to item 1, wherein the primary inceptor member is rigidly attached at its primary inceptor member base to the apparatus base (196) and comprises an elongated flexible primary shaft portion (194) to which a plurality of primary strain gauges (198) of the primary sensor assembly is attached in an angular distributed manner, such that the primary strain gauges provide electrical signals in response to lateral bending or flexing of the elongated flexible primary shaft portion (194).

3. Flight control system according to item 1 or 2, wherein the secondary inceptor member rigidly attached at its secondary inceptor member base to the upper mounting portion (196) of the primary inceptor member and comprises an elongated flexible secondary shaft portion (194) to which a plurality of secondary strain gauges (198) of the secondary sensor assembly is attached in an angular distributed manner, such that the secondary strain gauges provide electrical signals in response to lateral bending or flexing of the elongated flexible secondary shaft portion (194).

4. Flight control system according to item 1 or 3, wherein the primary inceptor member (32a; 32b) is moveably mounted at its primary inceptor member base relative to the apparatus base (34a; 34b), by means of a primary multiple degree of freedom assembly (36a; 36b), such that the primary inceptor member can pivotably move around the two independent maneuvering axes associated to the primary inceptor member.

5. Flight control system according to item 1, 2 or 4, wherein the secondary inceptor member (50a; 50b) is moveably mounted at its secondary inceptor member base relative to the upper mounting portion of the primary inceptor member (32a; 32b) by means of a secondary multiple degree of freedom assembly (52a; 52b), such that the secondary inceptor member can pivotably move around the two independent maneuvering axes associated to the secondary inceptor member.

6. Flight control system according to one of items 1 to 5, wherein the primary inceptor member (32a; 32b) is provided in the form of a handle which can be grasped by a pilot's hand at its grip portion.

7. Flight control system according to one of items 1 to 6, wherein the secondary inceptor member (50a, 50b) is provided in the form of thumbstick or thumbknob which can be actuated at its actuating portion by the thumb of the/a pilot's hand grasping the primary inceptor member at its grip portion with the other fingers of the pilot's hand.

8. Flight control system according to one of items 1 to 7, wherein the apparatus comprises at least one further manually operable control member (63a; 63b) for generating at least one further electronic control signal or command.

9. Flight control system according to item 8, wherein the or at least one further manually operable control member (63a; 63b) is located on the primary inceptor member or a surface of the apparatus base (34a; 34b).

10. Flight control system according to one of items 1, 4 to 9, wherein the primary sensor assembly (36a; 36b) is arranged within the apparatus base (34a; 34b), preferably integrated with the primary multiple degree of freedom assembly.

11. Flight control system according to one of items 1, 4 to 10, wherein the secondary sensor assembly (54a; 54b) is arranged within the upper mounting portion of the primary inceptor member (32a; 32b), preferably integrated with the secondary multiple degree of freedom assembly.

12. Flight control system according to one of items 1, 4 to 11, wherein the apparatus (30a; 30b) comprises a passive primary force-feedback assembly, which is provided to apply counter forces to the primary inceptor member opposite to a respective pivoting displacement applied to the primary inceptor member with respect to each of its maneuvering axes, wherein the passive primary force-feedback assembly applies the counter forces according to a predetermined force-feel characteristic.

13. Flight control system according to one of items 1, 4 to 11, wherein the apparatus (30a; 30b) comprises an active primary force-feedback assembly (44a; 44b), which is provided to apply counter forces to the primary inceptor member (32a; 32b) opposite to a respective pivoting force or displacement applied to the primary inceptor member with respect to each of its maneuvering axes, wherein the active primary force-feedback assembly (44a; 44b) applies the counter forces according to a variable force-feel characteristic as commanded by electronic control signals or commands received by the active primary force-feedback assembly.

14. Flight control system according to item 12 or 13, wherein the passive or active primary force-feedback assembly is arranged within the apparatus base (34a; 34b), preferably integrated with at least one of the primary multiple degree of freedom assembly and the primary sensor assembly.

15. Flight control system according to one of items 1, 4 to 14, wherein the apparatus (30a; 30b) comprises a passive secondary force-feedback assembly, which is provided to apply counter forces to the secondary inceptor member opposite to a respective pivoting displacement applied to the secondary inceptor member with respect to each of its maneuvering axes, wherein the passive secondary force-feedback assembly applies the counter forces according to a predetermined force-feel characteristic.

16. Flight control system according to one of items 1, 4 to 14, wherein the apparatus (30a; 30b) comprises an active secondary force-feedback assembly (56a; 56b), which is provided to apply counter forces to the secondary inceptor member (50a; 50b) opposite to a respective pivoting force or displacement applied to the secondary inceptor member with respect to each of its maneuvering axes, wherein the active secondary force-feedback assembly (56a; 56b) applies the counter forces according to a variable force-feel characteristic as commanded by electronic control signals or commands received by the active secondary force-feedback assembly.

17. Flight control system according to item 15 or 16, wherein the passive or active secondary force-feedback assembly is arranged within the upper mounting portion of the primary inceptor member (32a; 32b), preferably integrated with at least one of the secondary multiple degree of freedom assembly and the secondary sensor assembly.

18. Flight control system according to one of items 1 to 17, wherein the flight control effected by the flight control computer system (12) comprises at least one of controlling flight control surfaces of the aircraft, controlling one or plural engines of the aircraft and controlling actuators of the aircraft.

19. Flight control system according to one of items 1 to 18, wherein the primary control mode is a normal control mode, in which the flight control is based on flight control signals or commands corresponding to or being based on the electronic flight control signals or commands generated by the primary sensor assembly (38a; 38b; 198) of the inceptor apparatus (30a; 30b), but is not based on flight control signals or commands corresponding to or being based on the electronic flight control signals or commands generated by the secondary sensor assembly (54a; 54b; 198) of the inceptor apparatus (30a; 30b), and wherein the secondary control mode is a redundancy control mode, in which the flight control is based on electronic flight control signals or commands corresponding to or being based on the electronic flight control signals or commands generated by the secondary sensor assembly (54a; 54b; 198) of the inceptor apparatus (30a; 30b), but is not based on flight control signals or commands corresponding to or being based on the electronic flight control signals or commands generated by the primary sensor assembly (38a; 38b; 198) of the inceptor apparatus (30a; 30b).

20. Flight control system according to one of items 1 to 19, wherein the flight control computer system (12) is configured to switch automatically between the primary control mode and the secondary control mode based on at least one of i) monitoring at least one condition related to the inceptor apparatus (30a; 30b), ii) at least one flight control signal or command received from the inceptor apparatus (30a; 30b) and iii) lack of at least one control signal or command to be received from the inceptor apparatus (30a; 30b).

21. Flight control system according to one of items 1 to 20, wherein a redundancy management functionality of the flight control computer system (12) or a separate redundancy management controller of the flight control system, possibly of the inceptor apparatus (30a, 30b), is configured to switch automatically between the primary control mode and the secondary control mode based on at least one of i) monitoring at least one condition related to the inceptor apparatus (30a; 30b), ii) at least one flight control signal or command received from the inceptor apparatus (30a; 30b), iii) lack of at least one control signal or command to be received from the inceptor apparatus (30a; 30b), iv) electronic flight control signals or commands generated by the primary sensor assembly (38a; 38b; 198) and v) electronic flight control signals or commands generated by the secondary sensor assembly (54a; 54b; 198).

22. Flight control system according to item 20 or 21, wherein the flight control computer system (12) or the redundancy management functionality of the flight control computer system (12) or the redundancy management controller is configured to recognize at least one failover condition of the inceptor apparatus (30a; 30b), wherein the at least one failover condition is related to at least one of the primary sensor assembly (38a; 38b; 198) and the primary control mode and indicates a possible impairment or failure to effect the flight control based on the electronic flight control signals or commands generated by the primary sensor assembly (38a; 38b; 198) of the inceptor apparatus (30a; 30b); and preferably is configured to initiate or effect a switching over from the primary control mode to the secondary control mode upon recognizing at least one failover condition.

23. Flight control system according to one of items 1 to 22, wherein of the primary sensor assembly (38a, 38b, 198) and the secondary sensor assembly (54a; 54b; 198) at least the primary sensor assembly (38a, 38b, 198) is a redundant sensor assembly, which is configured to generate redundant electronic flight control signals or commands, preferably at least threefold redundant electronic flight control signals or commands.

24. Flight control system according to item 23, wherein the redundant sensor assembly has for each of the two independent maneuvering axes at least two, preferably at least three independent sensors, which are configured to generate independent electronic flight control signals or commands, wherein the redundant electronic flight control signals or commands are based on or include said generated independent electronic flight control signals or commands.

25. Flight control system according to item 23 or 24, wherein a/the redundancy management functionality of the flight control computer system (12) or a/the separate redundancy management controller of the flight control system, possibly of the inceptor apparatus (30a, 30b), is configured to monitor the redundant electronic flight control signals or commands for the occurrence of at least one predetermined condition comprising at as least one of a failure condition and a discrepancy condition, and is further configured to respond to such an occurrence of at least one predetermined condition by at least one of
i) mitigating at least one of a failure and a discrepancy within the redundant electronic flight control signals or commands,
ii) determining the electronic flight control signals or commands to be used as basis for the flight control, and
iii) recognizing a/the failover condition of the inceptor apparatus (30a; 30b), wherein the failover condition is related to at least one of the primary sensor assembly (38a, 38b, 198) and the primary control mode, and preferably automatically switching from the primary control mode to the secondary control mode upon recognizing the failover condition.

26. Flight control system according to one of items 1 to 25, comprising at least one of a visual and acoustic signaling device to indicate at least one of i) the current active control mode of the primary control mode and the secondary control mode, ii) a switch over from the primary control mode to the secondary control mode and iii) the recognition of a/the failover condition.

27. Flight control system according to one of items 1 to 26, wherein the flight control computer system (12) is configured to switch between the primary control mode and the secondary control mode based on at least one further control signal or command received from the inceptor apparatus (30a; 30b).

28. Flight control system according to item 27, wherein the flight control computer system (12) can be switched between the primary control mode and the secondary control mode by manually operating a/the control member (63a; 63b) of the inceptor apparatus (30a; 30b).

29. Flight control system according to item 28, wherein the control member is a movable guard member, which blocks at least one of manual access to the secondary inceptor member (50a; 50b) and an actuation of the secondary inceptor member (50a; 50b) in a blocking position and enables manual actuation of the secondary inceptor member (50a; 50b) by a pilot's thumb in an enablement position.

30. Flight control system according to one of items 1, 4 to 29, wherein the flight control computer system (12) is configured to control at least one active force-feedback assembly (44a; 44b; 56a; 56b) of the inceptor apparatus (30a; 30b).

31. Flight control system according to one of items 1 to 30, comprising a first inceptor apparatus (30a) and a second inceptor apparatus (30b), wherein the first and second inceptor apparatus are preferably located on a left and right side of a pilot's seat.

32. Flight control system according to item 31, wherein the flight control computer system (12) is configured to effect the flight control alternatively according to the primary or secondary control mode based on flight control signals or commands received from the first inceptor apparatus (30a) independently of whether the flight control is currently effected according to the primary or secondary control mode based on flight control signals or commands received from the second inceptor apparatus (30b), and wherein the flight control computer system (12) is configured to effect the flight control alternatively according to the primary or secondary control mode based on flight control signals or commands received from the second inceptor apparatus (30b) independently of whether the flight control is currently effected according to the primary or secondary control mode based on flight control signals or commands received from the first inceptor apparatus (30a).

33. Aircraft (200) comprising a flight control system (10) according to one of the preceding items.

34. Aircraft according to item 33, wherein the aircraft (200) is at least one of a single pilot aircraft, an aircraft having a vertical take-off and landing capability and an aircraft of the canard type.

The invention claimed is:
1. A flight control system for an aircraft, comprising at least one inceptor apparatus, which is electronically or optically connected with a flight control computer system, the flight control computer system being configured to effect a flight control of the aircraft based on flight control signals or commands received from the at least one inceptor apparatus;
wherein the at least one inceptor apparatus comprises:
an apparatus base;
a primary inceptor member provided in the form of a stick member having a grip portion, at which the stick member can be gripped by a pilot's hand, wherein the primary inceptor member is mounted at a primary inceptor member base on the apparatus base;
a primary sensor assembly which is provided to generate electronic flight control signals or commands in response to at least one of i) pivoting movements of the primary inceptor member around each of two independent maneuvering axes associated to the primary inceptor member, ii) forces acting on or via the primary inceptor member in pivoting directions with respect to each of the two independent maneuvering axes associated to the primary inceptor member, and iii) lateral flexing or bending of the primary inceptor member;
a secondary inceptor member having an actuating portion, wherein the secondary inceptor member is mounted at a secondary inceptor member base on an upper mounting portion of the primary inceptor member opposite to the primary inceptor member base; and
a secondary sensor assembly which is provided to generate electronic flight control signals or commands in response to at least one of i) pivoting movements of the secondary inceptor member around each of two independent maneuvering axes associated to the secondary inceptor member, ii) forces acting on or via the secondary inceptor member in pivoting directions with respect to each of the two independent maneuvering axes associated to the secondary inceptor member, and iii) lateral flexing or bending of the secondary inceptor member;

wherein the flight control computer system is configured to effect the flight control in a primary control mode based on flight control signals or commands corresponding to or being based on the electronic flight control signals or commands generated by the primary sensor assembly of the at least one inceptor apparatus and to effect the flight control in a secondary control mode based on flight control signals or commands corresponding to or being based on the electronic flight control signals or commands generated by the secondary sensor assembly of the at least one inceptor apparatus;

wherein the flight control computer system is configured to switch between the primary control mode and the secondary control mode based on at least one further control signal or command received from the at least one inceptor apparatus;

wherein the flight control computer system can be switched between the primary control mode and the secondary control mode by manually operating a control member of the at least one inceptor apparatus;

wherein the control member is a movable guard member, which blocks at least one of manual access to the secondary inceptor member and an actuation of the secondary inceptor member in a blocking position and enables manual actuation of the secondary inceptor member in an enablement position; and wherein of the primary sensor assembly and the secondary sensor assembly, at least the primary sensor assembly is a redundant sensor assembly, which is configured to generate redundant electronic flight control signals or commands.

2. The flight control system according to claim 1, wherein the flight control effected by the flight control computer system comprises at least one of controlling flight control surfaces of the aircraft, controlling one or plural engines of the aircraft and controlling actuators of the aircraft.

3. The flight control system according to claim 1, wherein the primary control mode is a normal control mode, in which the flight control is based on flight control signals or commands corresponding to or being based on the electronic flight control signals or commands generated by the primary sensor assembly of the at least one inceptor apparatus, but is not based on flight control signals or commands corresponding to or being based on the electronic flight control signals or commands generated by the secondary sensor assembly of the at least one inceptor apparatus, and wherein the secondary control mode is a redundancy control mode, in which the flight control is based on flight control signals or commands corresponding to or being based on the electronic flight control signals or commands generated by the secondary sensor assembly of the at least one inceptor apparatus, but is not based on flight control signals or commands corresponding to or being based on the electronic flight control signals or commands generated by the primary sensor assembly of the at least one inceptor apparatus.

4. The flight control system according to claim 1, wherein the flight control computer system is configured to switch automatically between the primary control mode and the secondary control mode based on at least one of i) monitoring at least one condition related to the at least one inceptor apparatus, ii) at least one flight control signal or command received from the at least one inceptor apparatus and iii) lack of at least one control signal or command to be received from the at least one inceptor apparatus.

5. The flight control system according to claim 1, wherein a redundancy management functionality of the flight control computer system or a separate redundancy management controller of the flight control system is configured to switch automatically between the primary control mode and the secondary control mode based on at least one of i) monitoring at least one condition related to the at least one inceptor apparatus, ii) at least one flight control signal or command received from the at least one inceptor apparatus, iii) lack of at least one control signal or command to be received from the at least one inceptor apparatus, iv) electronic flight control signals or commands generated by the primary sensor assembly and v) electronic flight control signals or commands generated by the secondary sensor assembly.

6. The flight control system according to claim 5, wherein the flight control computer system or the redundancy management functionality of the flight control computer system or the redundancy management controller is configured to recognize at least one failover condition of the at least one inceptor apparatus, wherein the at least one failover condition is related at least one of the primary sensor assembly and the primary control mode and indicates a possible impairment or failure to effect the flight control based on the electronic flight control signals or commands generated by the primary sensor assembly of the at least one inceptor apparatus; and is configured to initiate or effect a switching over from the primary control mode to the secondary control mode upon recognizing at least one failover condition.

7. The flight control system according to claim 1, wherein the redundant sensor assembly has for each of the two independent maneuvering axes associated to the primary inceptor member at least two independent sensors, which are configured to generate independent electronic flight control signals or commands, wherein the redundant electronic flight control signals or commands are based on or include said generated independent electronic flight control signals or commands.

8. The flight control system according to claim 1, wherein a redundancy management functionality of the flight control computer system or a separate redundancy management controller of the flight control system is configured to monitor the redundant electronic flight control signals or commands for the occurrence of at least one predetermined condition comprising at as least one of a failure condition and a discrepancy condition, and is further configured to respond to such an occurrence of at least one predetermined condition by at least one of i) mitigating at least one of a failure and a discrepancy within the redundant electronic flight control signals or commands, ii) determining the electronic flight control signals or commands to be used as basis for the flight control, and iii) recognizing a failover condition of the at least one inceptor apparatus, wherein the failover condition is related to at least one of the primary sensor assembly and the primary control mode, and automatically switching from the primary control mode to the secondary control mode upon recognizing the failover condition.

9. The flight control system according to claim 1, comprising at least one of a visual and acoustic signaling device to indicate at least one of i) the current active control mode of the primary control mode and the secondary control mode, ii) a switch over from the primary control mode to the secondary control mode and iii) the recognition of a failover condition.

10. The flight control system according to claim 1, wherein the at least one inceptor apparatus comprises a first inceptor apparatus and a second inceptor apparatus, wherein the first inceptor apparatus is located on a left side of a pilot's seat, and wherein the second inceptor apparatus is located on a right side of the pilot's seat.

11. The flight control system according to claim 10, wherein the flight control computer system is configured to effect the flight control alternatively according to the primary or secondary control mode based on flight control signals or commands received from the first inceptor apparatus independently of whether the flight control is currently effected according to the primary or secondary control mode based on flight control signals or commands received from the second inceptor apparatus, and wherein the flight control computer system is configured to effect the flight control alternatively according to the primary or secondary control mode based on flight control signals or commands received from the second inceptor apparatus independently of whether the flight control is currently effected according to the primary or secondary control mode based on flight control signals or commands received from the first inceptor apparatus.

12. The flight control system according to claim 1, wherein the flight control system is configured such that the primary control mode is a normal control mode, in which the flight control of the aircraft is based on input provided by a pilot by the primary inceptor member, and that the secondary control mode is a redundancy control mode, in which the flight control is based on pilot input provided by the pilot by means of the secondary inceptor member, so that the secondary inceptor member redundantly enables pilot input in case the pilot input by the primary inceptor member fails.

13. An aircraft comprising a flight control system according to claim 1, wherein the aircraft is at least one of a single pilot aircraft, an aircraft having a vertical take-off and landing capability and an aircraft of the canard type.

14. The flight control system of claim 1, wherein the secondary inceptor member can be manually actuated by a pilot's thumb.

15. A flight control system for an aircraft, comprising at least one inceptor apparatus, which is electronically or optically connected with a flight control computer system, the flight control computer system being configured to effect a flight control of the aircraft based on flight control signals or commands received from the at least one inceptor apparatus;
wherein the at least one inceptor apparatus comprises:
an apparatus base;
a primary inceptor member provided in the form of a stick member having a grip portion, at which the stick member can be gripped by a pilot's hand, wherein the primary inceptor member is mounted at a primary inceptor member base on the apparatus base;
a primary sensor assembly which is provided to generate electronic flight control signals or commands in response to at least one of i) pivoting movements of the primary inceptor member around each of two independent maneuvering axes associated to the primary inceptor member, ii) forces acting on or via the primary inceptor member in pivoting directions with respect to each of the two independent maneuvering axes associated to the primary inceptor member, and iii) lateral flexing or bending of the primary inceptor member;
a secondary inceptor member having an actuating portion, wherein the secondary inceptor member is mounted at a secondary inceptor member base on an upper mounting portion of the primary inceptor member opposite to the primary inceptor member base; and
a secondary sensor assembly which is provided to generate electronic flight control signals or commands in response to at least one of i) pivoting movements of the secondary inceptor member around each of two independent maneuvering axes associated to the secondary inceptor member, ii) forces acting on or via the secondary inceptor member in pivoting directions with respect to each of the two independent maneuvering axes associated to the secondary inceptor member, and iii) lateral flexing or bending of the secondary inceptor member;
wherein the flight control computer system is configured to effect the flight control in a primary control mode based on flight control signals or commands corresponding to or being based on the electronic flight control signals or commands generated by the primary sensor assembly of the at least one inceptor apparatus and to effect the flight control in a secondary control mode based on flight control signals or commands corresponding to or being based on the electronic flight control signals or commands generated by the secondary sensor assembly of the at least one inceptor apparatus;
wherein the flight control computer system is configured to switch between the primary control mode and the secondary control mode based on at least one further control signal or command received from the at least one inceptor apparatus;
wherein the flight control computer system can be switched between the primary control mode and the secondary control mode by manually operating a control member of the at least one inceptor apparatus;
wherein the control member is a movable guard member, which blocks at least one of manual access to the secondary inceptor member and an actuation of the secondary inceptor member in a blocking position and enables manual actuation of the secondary inceptor member in an enablement position;
wherein a redundancy management functionality of the flight control computer system or a separate redundancy management controller of the flight control system is configured to switch automatically between the primary control mode and the secondary control mode based on at least one of i) monitoring at least one condition related to the at least one inceptor apparatus, ii) at least one flight control signal or command received from the at least one inceptor apparatus, iii) lack of at least one control signal or command to be received from the at least one inceptor apparatus, iv) electronic flight control signals or commands generated by the primary sensor assembly and v) electronic flight control signals or commands generated by the secondary sensor assembly; and
wherein the flight control computer system or the redundancy management functionality of the flight control computer system or the redundancy management controller is configured to recognize at least one failover condition of the at least one inceptor apparatus, wherein the at least one failover condition is related at least one of the primary sensor assembly and the primary control mode and indicates a possible impairment or failure to effect the flight control based on the electronic flight control signals or commands generated by the primary sensor assembly of the at least one inceptor apparatus; and is configured to initiate or effect a switching over from the primary control mode to the secondary control mode upon recognizing at least one failover condition.

16. A flight control system for an aircraft, comprising at least one inceptor apparatus, which is electronically or optically connected with a flight control computer system, the flight control computer system being configured to effect a flight control of the aircraft based on flight control signals or commands received from the at least one inceptor apparatus;
   wherein the at least one inceptor apparatus comprises:
      an apparatus base;
         a primary inceptor member provided in the form of a stick member having a grip portion, at which the stick member can be gripped by a pilot's hand, wherein the primary inceptor member is mounted at a primary inceptor member base on the apparatus base;
      a primary sensor assembly which is provided to generate electronic flight control signals or commands in response to at least one of i) pivoting movements of the primary inceptor member around each of two independent maneuvering axes associated to the primary inceptor member, ii) forces acting on or via the primary inceptor member in pivoting directions with respect to each of the two independent maneuvering axes associated to the primary inceptor member, and iii) lateral flexing or bending of the primary inceptor member;
      a secondary inceptor member having an actuating portion, wherein the secondary inceptor member is mounted at a secondary inceptor member base on an upper mounting portion of the primary inceptor member opposite to the primary inceptor member base; and
      a secondary sensor assembly which is provided to generate electronic flight control signals or commands in response to at least one of i) pivoting movements of the secondary inceptor member around each of two independent maneuvering axes associated to the secondary inceptor member, ii) forces acting on or via the secondary inceptor member in pivoting directions with respect to each of the two independent maneuvering axes associated to the secondary inceptor member, and iii) lateral flexing or bending of the secondary inceptor member;
   wherein the flight control computer system is configured to effect the flight control in a primary control mode based on flight control signals or commands corresponding to or being based on the electronic flight control signals or commands generated by the primary sensor assembly of the at least one inceptor apparatus and to effect the flight control in a secondary control mode based on flight control signals or commands corresponding to or being based on the electronic flight control signals or commands generated by the secondary sensor assembly of the at least one inceptor apparatus;
   wherein the flight control computer system is configured to switch between the primary control mode and the secondary control mode based on at least one further control signal or command received from the at least one inceptor apparatus;
   wherein the flight control computer system can be switched between the primary control mode and the secondary control mode by manually operating a control member of the at least one inceptor apparatus;
   wherein the control member is a movable guard member, which blocks at least one of manual access to the secondary inceptor member and an actuation of the secondary inceptor member in a blocking position and enables manual actuation of the secondary inceptor member in an enablement position; and
   wherein the flight control system is configured such that the primary control mode is a normal control mode, in which the flight control of the aircraft is based on input provided by a pilot by the primary inceptor member, and that the secondary control mode is a redundancy control mode, in which the flight control is based on pilot input provided by the pilot by means of the secondary inceptor member, so that the secondary inceptor member redundantly enables pilot input in case the pilot input by the primary inceptor member fails.

* * * * *